United States Patent [19]

Ganem

[11] Patent Number: 4,493,111
[45] Date of Patent: Jan. 8, 1985

[54] ELECTRONIC ANTENNA DECOUPLING PROCESS AND DEVICE

[75] Inventor: Hervé Ganem, Paris, France

[73] Assignee: Thomson-CSF, Paris, France

[21] Appl. No.: 450,008

[22] Filed: Dec. 15, 1982

[30] Foreign Application Priority Data

Dec. 18, 1981 [FR] France ............................ 81 23730

[51] Int. Cl.³ .............................................. H04B 1/44
[52] U.S. Cl. ......................................... 455/79; 455/24
[58] Field of Search ................... 455/24, 78, 79, 276, 455/278; 343/850; 370/32

[56] References Cited

U.S. PATENT DOCUMENTS

| | | | |
|---|---|---|---|
| 3,696,429 | 10/1972 | Tressa | 455/24 |
| 3,699,444 | 10/1972 | Ghose et al. | 455/79 |
| 3,810,182 | 5/1974 | White et al. | 455/79 |
| 4,384,366 | 11/1983 | Kaitsuka | 455/278 |
| 4,423,505 | 12/1983 | Greig | 455/79 |

Primary Examiner—Jin F. Ng
Attorney, Agent, or Firm—Oblon, Fisher, Spivak, McClelland & Maier

[57] ABSTRACT

An electronic process and device are provided for decoupling a receiving antenna situated in the immediate vicinity of a transmitting antenna transmitting a frequency modulated interfering signal.

The process consists in superimposing on each of the signals for the static control of variable attenuators, disposed in a regulation loop for cancelling out the interfering signal received by the antenna, a signal whose amplitude is proportional, at all times, to the difference between the carrier frequency of the interfering signal and the instantaneous value of its modulation signal $\phi'_B(t)$.

6 Claims, 1 Drawing Figure

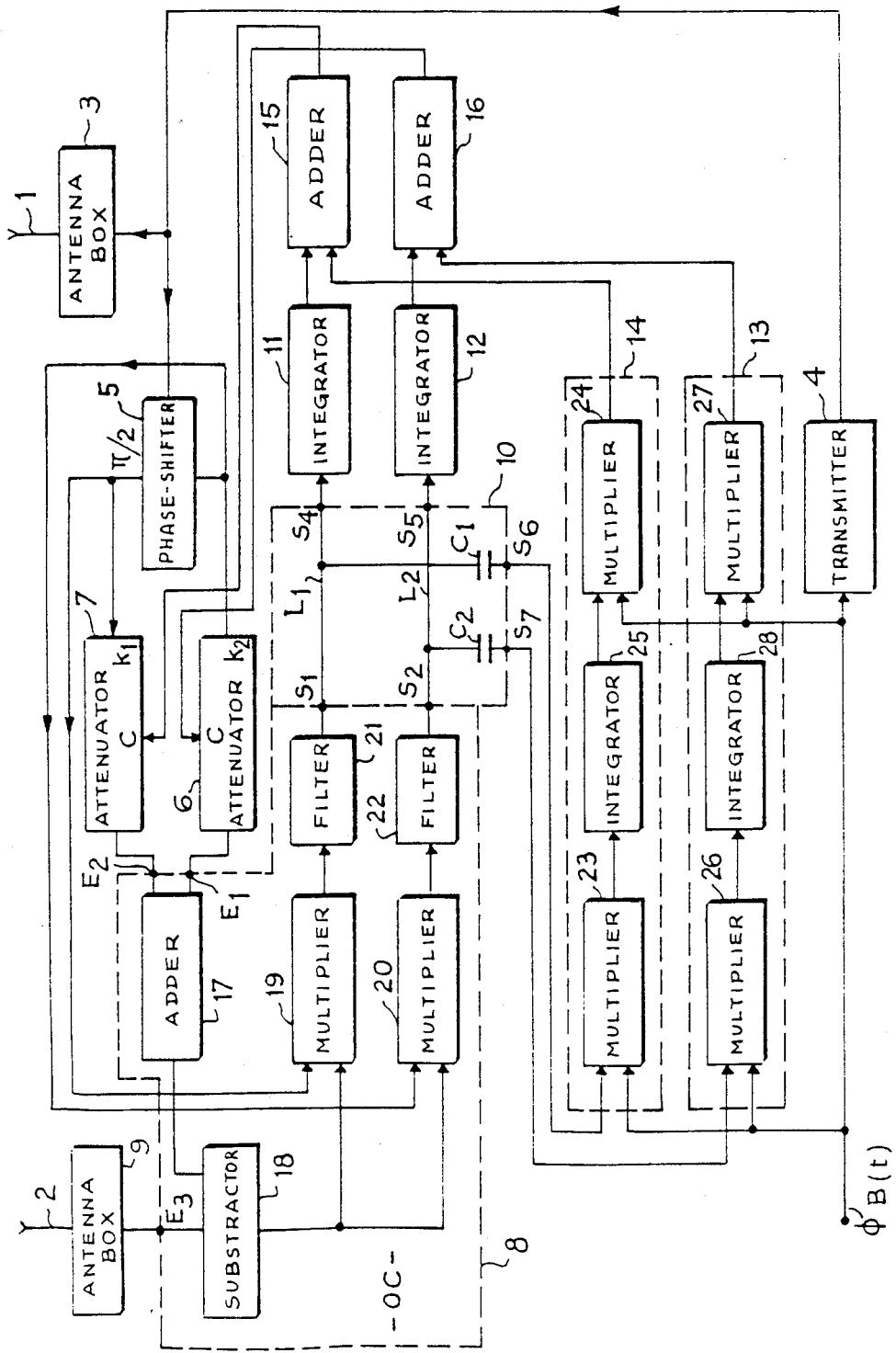

ELECTRONIC ANTENNA DECOUPLING PROCESS AND DEVICE

BACKGROUND OF THE INVENTION

The present invention relates to an electronic antenna decoupling device and process for suppressing a frequency modulated interfering signal, of a useful signal also modulated in frequency, received on a receiving antenna by coupling with a transmitting antenna situated in the immediate vicinity of the receiving antenna, the coupling occuring either directly or indirectly by multiple reflections from surrounding objects such as buildings.

The process and the device of the invention apply particularly to the case where the interfering signal, which is an attenuated and phase-shifted replica of the transmission signal, may be represented by an equation of the form:

$$c'(t) = kB \cos(\omega_1 t + \phi_B(t) + \theta_B + \lambda) \quad (1)$$

where:
B represents the amplitude of the transmission signal
$\omega_1$ represents the pulsation of the transmission carrier frequency
$\phi_B(t)$ represents the phase or frequency modulation of the transmission signal
$\theta_B$ the phase shift of the modulation signal
k and $\lambda$ being respectively the attenuation and phase rotation coefficients introduced by the space separating the receiving antenna from the transmitting antenna.

A device is known for suppressing at least partly the frequency modulated interfering signal received by an antenna. This device is formed by an assembly of elements which, from the interfering signal taken from the transmitting antenna, produce a compensation signal whose attenuation and phase rotation correspond to the attenuation and phase rotation which the interfering signal undergoes when passing from the transmitting antenna to the receiving antenna, on the assumption that the interfering signal undergoes, in the interantennae space, an attenuation and phase rotation which are constant in time, independent of the modulation signal $\phi_B(t)$. The compensation signal is subtracted from the composite signal received by the receiver so as to retain only the useful part of the signal received.

The adjustment of the attenuation k and phase rotation $\lambda$ values of the compensation signal is obtained by adjusting two variable attenuators whose adjustment values $k_1$ and $k_2$ are determined by the relationships $$k_1 = k \cos \lambda \quad (2)$$

and $$k_2 = k \sin \lambda \quad (3)$$

The device calculates first of all the differences $$\epsilon_1 = k \cos \lambda - k_1 \quad (4)$$

and $$\epsilon_2 = k \sin \lambda - k_2 \quad (5)$$

and a regulation loop adjusts the values $k_1$ and $k_2$ of the adjustable attenuators to cancel out these differences.

At equilibrium, when the differences $\epsilon_1$ and $\epsilon_2$ are zero, the compensation signal has the same amplitude and phase characteristics as the interfering signal received.

Now, practice has shown that, when the regulating loop has reached its equilibrium, the signals $\epsilon_1$ and $\epsilon_2$ are not cancelled out and that there remains an AC residue for each of these signals which is phase coherent or in phase opposition with the modulating signal $\phi_B(t)$ of the transmitted interfering signal. It follows that the above-mentioned device does indeed cancel out the carrier frequency of the interfering signal but it remains inefficient for modulation frequencies. Thus, the components of the interfering signal are only partially eliminated.

The imperfect result thus obtained is partly explained by the fact that the attenuation and phase rotation undergone by the interfering signal during its travel in space between the antennae are not constants independent of the modulation signal $\phi_B(t)$. On the contrary, assumptions and tests carried out during elaboration of the device of the invention have shown that each frequency of the spectrum of the modulated wave undergoes attenuations and phase-shifts which depend on its position in the spectrum. It is apparent that in the proximity of the carrier frequency $f_o$, the variations of the phase and of the amplitude of each frequency of the spectrum of the modulated wave received are practically linear as a function of its position in the spectrum. Consequently, it is possible to liken the transfer function of inter-antenna space to that of a linear filter of equation:

$$H(\omega) = (k_o + \epsilon_k(\omega - \omega_1))e^{j(\lambda_o - \epsilon_\lambda)(\omega - \omega_1)} \quad (6)$$

where: $k_o$ is the attenuation coefficient of the filter at frequency $f_o$,
$\epsilon_k$ represents the slope of the straight line representing the attenuation in the neighborhood of frequency $f_o$, $$\omega_1 = \omega_o + \Delta\omega,$$

represents the pulsation of the carrier wave of the interfering signal and $\omega_o$ the pulsation of the carrier wave of the useful signal,
$\lambda_o$ represents the phase-shift of the filter at frequency $f_o$,
$\epsilon_\lambda$ represents the slope of the straight line representing the phase-shift in the neighborhood of frequency $f_o$.

It follows that a frequency modulated interfering signal, able to be represented by the equation $$c = B \cos(\omega_1 t + \phi_B(t) + \theta_B) \quad (7)$$

is transformed after passing through the linear filter formed by the inter-antennae space into a signal $$c'(t) = B/2(k_o + \epsilon_k \phi'_B(t - \epsilon_\lambda)) \cos(\omega_1 t + \phi_B(t) + \theta_B(t) + \lambda_o - \epsilon_\lambda \phi'_B(t)) \quad (8)$$

It follows that the coefficients k and $\lambda$ of equation (1) which were considered as constants in elaborating the prior device, depend in fact on time and may be represented by equations $$k(t) = k_o + \epsilon_k \cdot \phi'_B(t - \epsilon_\lambda) \quad (9)$$

and $$\lambda(t) = \lambda_o - \epsilon_\lambda \cdot \phi'_B(t) \quad (10)$$

where $\phi'_B(t)$ represents the derivative of the first order of the phase modulation signal $\phi_B(t)$.

SUMMARY OF THE INVENTION

The aim of the invention is to palliate the above-mentioned disadvantages.

To this end, the first object of the invention is an electronic antenna-decoupling process for suppressing an interfering signal, modulated in frequency by a low frequency signal of amplitude $\phi'_B(t)$, received by a receiving antenna by coupling with a transmitting antenna situated in the immediate vicinity of the receiving antenna, the interfering signal undergoing in the inter-antennae space an attenuation k and a phase shift λ, which process consists in picking up the interfering signal from the transmitting antenna so as to provide two signals respectively in phase and in quadrature with the interfering signal, attenuating the in phase and in quadrature signals by means of adjustable attenuators and, from the signal received by the receiving antenna, the attenuated signals, the in phase and in phase quadrature signals at the attenuation values $k_1$ and $k_2$ of the attenuators, forming two signals (($k_1-k(t)\cos\lambda(t)$), ($k_2-k(t)\sin\lambda(t)$)) representing the difference in values between the attenuation coefficients of the variable attenuators and the respective products of the cosine and sine of phase-shift λ(t) multiplied by the value of the attenuation k(t), then in applying respectively the two signals thus formed to the input of two integrators so as to obtain at the output of these two integrators two signals for static control of the attenuators so as to cancel out the component of the carrier frequency of the interfering signal received, and in superimposing on each of the static control signals a signal whose amplitude is proportional, at all times, to the difference between the carrier frequency of the interfering signal and the instantaneous value of the frequency of the modulating signal.

According to another feature the process of the invention consists, so as to obtain the signal to be superimposed on the static control signals of the attenuators, in separating the DC and AC components of each control signal, and transforming the AC component obtained into a DC magnitude proportional to the amplitude of the AC component, for multiplying it by the low frequency signal of amplitude $\phi'_B(t)$.

The invention also provides a device for implementing the process of the invention.

BRIEF DESCRIPTION OF THE DRAWINGS

Other features and advantages of the invention will appear from the description made with reference to the single accompanying FIGURE which shows the antenna decoupling device of the invention.

DESCRIPTION OF THE PREFERRED EMBODIMENT

The device shown in the FIGURE comprises a transmitting antenna 1 and a receiving antenna 2. The transmitting antenna 1 is connected through an antenna box 3 to the output stage of a modulated frequency transmitter 4. The frequency modulation stage 4 receives at its input a low frequency signal of amplitude $\phi'_B(t)$ transmitted by a modulation source, not shown. A phase-shifter 5 is connected by its input to the antenna box 3 and delivers at its outputs a signal in phase with the transmission signal to the input of a variable attenuator 6 and a signal in quadrature with the transmission signal to the input of a variable attenuator 7. The output signals of the variable attenuators 6 and 7 are fed to the respective inputs $E_1$ and $E_2$ of a computing means 8. The computing means 8 further receives at its input $E_3$ the signal received by the receiving antenna 2 and transiting through the antenna box 9. The computing means 8 is also connected by its outputs $S_1$ and $S_2$ to a separating means 10 for separating the AC and DC components forming the output signals of computing means 8. The outputs $S_4$ to $S_7$ of separating means 10 are connected respectively to the inputs of control means 11 to 14. The output of control means 11 is connected to an input of an adder 15 which is connected through a second input to the output of the control means 14. Similarly, the output of control means 12 is connected to an input of an adder 16 whose second output is connected to the output of a control means 13. The respective outputs of adders 15 and 16 are connected respectively to the control inputs of the variable attenuators 6 and 7.

The computing means 8 comprises an adder 17, a subtractor 18, two multipliers 19 and 20 as well as filters 21 and 22. Adder 17 is connected by its two inputs to the respective inputs $E_1$ and $E_2$ of computing means 8 and by its output to an input of subtractor 18 whose other input is connected to the input $E_3$ of computing means 8, the output of subtractor 18 is connected to an input of multiplier 19 and to an input of multiplier 20. Multiplier 19 is connected by its second input to the output of phase-shifter 5 which delivers a signal which is in quadrature with respect to the transmission signal. The second input of multiplier 20 is connected to the output of phase-shifter 5 which delivers a signal in phase with the transmission signal. The respective outputs of multipliers 19 and 20 are connected to the respective inputs of two low-pass filters 21 and 22. The respective outputs of filters 21 and 22 are connected respectively to the outputs $S_1$ and $S_2$ of computing means 8.

Separator 10 is formed by two conductors $L_1$ and $L_2$ connecting respectively the output $S_1$ of computing means 8 to the output $S_4$ of the separator and the output $S_2$ of computing means 8 to the output $S_5$ of the separator and to capacitors $C_1$ and $C_2$. One end of capacitor $C_1$ is connected to conductor $L_1$ and one end of capacitor $C_2$ is connected to conductor $L_2$. The other ends of capacitors $C_1$ and $C_2$ are connected respectively to the outputs $S_6$ and $S_7$ of attenuator 10. The control means 11 and 12 are formed by integrators. Control means 13 is formed by two multipliers 23 and 24 and an integrator 25. One input of multiplier 23 is connected to the output $S_6$ of separator 10 and its other input receives the frequency modulation low frequency signal of amplitude $\phi'_B(t)$. One input of multiplier 24 is connected to the output of integrator 25 and its other input is connected to the modulation source. Integrator 25 has its input connected to the output of multiplier 23. The output of multiplier 24 is applied to one input of an adder 16. Similarly, control means 14 comprises two multipliers 26 and 27 and an integrator 28. Multiplier 26 is connected by one input to the output $S_7$ of separator 10 by its other input to the modulation source. The output of multiplier 26 is connected to the input of integrator 28. Multiplier 27 is connected by an input to the modulation source delivering the signal $\phi'_B(t)$ and by its other input to the output of integrator 28. The output of multiplier 27 is connected to an input of adder 15. The whole of the material devices for constructing the device of the invention form part of devices well known in the state of the art and there is then no need to describe their constructional details.

It should however be noted, for ease of construction of the device which has just been described, that the variable attenuators 6 and 7 may be formed by the attenuators P5 ATTL400 commercialized by the American firm OLEKTRON and that the phase-shifter 5 may be formed by the component PSCQZ commercialized by the American firm MINICIRCUIT.

The operation of the device which has just been described is as follows. The interfering signal transmitted by transmitter 4 follows two different routes. A first route is formed by the path over which the resulting electromagnetic wave travels in the air between the transmitting antenna 1 and the receiving antenna 2. The second route is formed by the path of the interfering signal through the electronic antenna decoupling device of the invention. The signal transmitted by antenna 1 is a signal modulated in frequency by the low frequency modulation signal of amplitude $\phi'_B(t)$ received at the input of the frequency modulation transmitter 4. In a way known per se, the low frequency signal of amplitude $\phi'_B(t)$ is transformed inside transmitter 4 so as to obtain the phase modulation $\phi_B(t)$ of the transmission signal. This transmission signal is consequently represented by the equation $$c(t) = B(\cos \omega_1 t + \phi_B(t) + \theta_B) \tag{7}$$

where $$\omega_1 = \omega_o + \Delta\omega$$

The signal received by the receiving antenna 2 is formed of a useful signal u(t) and the interfering signal c'(t) related by the equation $$e(t) = u(t) + c'(t) \tag{11}$$

c'(t) being represented by the above-mentioned equation (1) and the useful signal u(t) having the form $$u(t) = S_u \cos(\omega_o t + \phi_u(t) + \theta_u) \tag{12}$$

where $\phi_u(t)$ represents the phase or frequency modulation of the useful signal and $\theta_u$ represents the phase-shift of the modulation signal.

From signal c(t), phase-shifter 5 delivers two signals in quadrature $c_1(t)$ and $c_2(t)$ which may be represented by the equations $$c_1(t) = B \cos(\omega_o t + \Delta\omega t + \phi_B(t) + \theta_B) \tag{13}$$

and $$c_2(t) = B \sin(\omega_o t + \Delta\omega t + \phi_B(t) + \theta_B) \tag{14}$$

The variable attenuators 6 and 7 deliver at their outputs the signals $k_1 c_1(t)$ and $k_2 c_2(t)$. These signals are added in adder 17 and the result of the addition is subtracted in subtractor 18 from signal $e_{(t)}$ received at input E3 of the computing means 8. The output of subtractor 18 delivers therefore a signal:

$$e'(t) + e(t) - (k_1 c_1(t) + k_2 c_1(t)) \tag{15}$$

Signal e'(t) is multiplied in multipliers 19 and 20 by the in phase and in quadrature components of the interfering signal c(t) delivered at the outputs of phase-shifter 5. The outputs of multipliers 19 and 20 deliver respectively two signals $e_1(t)$ and $e_2(t)$ which, after filtering in the low-pass filters 21 and 22, may be represented by the equations:

$$e_1(t) = \frac{S_u B}{2} \cos(\Delta\omega t + \phi_B(t) - \phi_u(t) - \Delta\theta) + \tag{16}$$

$$\frac{B^2}{2}(k(t) \cos\lambda(t) - k_1)$$

$$e_2(t) = \frac{S_u B}{2} \sin(\Delta\omega t + \phi_B(t) - \phi_u(t) + \Delta\theta) - \tag{17}$$

$$\frac{B^2}{2}(k(t) \cos\lambda(t) + k_2) \text{ with } \Delta\theta = \theta_B - \theta_u$$

Signals $e_1(t)$ and $e_2(t)$ are each formed from a zero mean value component and a non zero component. After integration in integrators 11 and 12, the zero mean value component disappears and there only remains at the outputs S1 and S2 of computing means 8 two error signals $e'_1(t)$ and $e'_2(t)$ which have for equation $$e'_1(t) = k(t) \cdot \cos \lambda(t) - k_1 \tag{18}$$

$$e'_2(t) = k(t) \cdot \sin \lambda(t) - k_2 \tag{19}$$

Since the attenuation k(t) and the phase shift $\lambda(t)$ depend on the constants $\epsilon_k$ and $\epsilon_\lambda$ of the linear filter formed by the inter-antennae space, signals $e'_1(t)$ and $e'_2(t)$ may by expressed using these constants by the following theoretical developments.

By substituting in equations (18) and (19) the values of k(t) and $\lambda(t)$ expressed by equations (9) and (10) by simplifying in the developments the infinitesimals of the second and third order, the components k(t) cos $\lambda(t)$ and k(t) sin $\lambda(t)$ of signals $e'_1(t)$ and $e'_2(t)$ are expressed in the form $$k(t) \cos \lambda(t) = k_o \cos \lambda_o + \phi'_B(t)(k_o \epsilon_\lambda \sin \lambda_o + \epsilon_k \cos \lambda_o) \tag{20}$$

$$k(t) \sin \lambda(t) = k_o \sin \lambda_o + \phi'_B(t)(-k_o \epsilon_\lambda \cos \lambda_o + \epsilon_k \sin \lambda_o) \tag{21}$$

where $\phi'_B(t)$ represents the frequency modulation of the transmitted signal.

By transferring expressions (20) and (21) of k(t) cos $\lambda(t)$ and k(t) sin $\lambda(t)$ to expressions (18) and (19) it can be shown that the signals $e'_1(t)$ and $e'_2(t)$ leaving filters 21 and 22 are formed of the respective DC components $$e'_{1a}(t) = k_1 - k_o \cos \lambda_o \tag{22}$$

$$e'_{2a}(t) = k_2 - k_o \sin \lambda_o \tag{23}$$

and respective AC components $$e'_{1b}(t) = \phi'_B(t)(k_o \epsilon_\lambda \sin \lambda_o + \epsilon_k \cos \lambda_o) \tag{24}$$

$$e'_{2b}(t) = \phi'_B(t)(-k_o \epsilon_\lambda \cos \lambda_o + \epsilon_k \sin \lambda_o) \tag{25}$$

The DC components of signals $e_1(t)$ and $e_2(t)$ are applied respectively to the inputs of integrators 11 and 12. These DC components are on the other hand blocked at the input of control means 13 and 14 by capacitors $C_1$ and $C_2$. The AC components are applied to the respective inputs of multipliers 23 and 26 which effect a multiplication of these components with the modulation signal $\phi'_B(t)$ and which apply the results of the multiplications to the respective inputs of integrators 25 and 28 which deliver signals whose amplitude is proportional to the signal $\phi'_B(t)$. The output signals of integrators 25 and 28 are again multiplied by the signal $\phi'_B(t)$ by means of multipliers 24 and 27 and the result of this multiplication is fed to the respective inputs of adders 16 and 15. Multipliers 24 and 27 have a variable gain amplifying role, the value of their gain being determined by the amplitude of the signal $\phi'_B(t)$. Since the amplitude of signal $\phi'_B(t)$ is, at all times, the frequency difference between the carrier frequency of the interfering signal and the instantaneous value of the frequency of the low frequency modulation signal, the output signals of multipliers 24 and 27 have an amplitude proportional to this frequency difference. The adder 15 delivers an output signal which is equal to the sum of the signals obtained at the output of integrator 11 and of control means 14, this signal acts on the control input of the variable attenuator 17 whose attenuation coefficient $k_1$ will vary so as to cancel out the DC and AC components of signal $e_1(t)$. Similarly, the output of adder 16 delivers a signal which is the sum of the signal leaving the integrator 12 and the control means 13, this signal acts on the control of the variable attenuator 6 which evolves so as to cancel out the DC and AC components of signal $e_2(t)$.

Although the principles of the present invention have been described above with respect to particular embodiments, it should be understood that the description has only been given by way of example and in no wise limits the scope of the invention.

What is claimed is:

1. An electronic antenna decoupling process for suppressing an intefering signal having a carrier frequency, modulated in frequency by a low frequency signal of amplitude $\phi'_B(t)$, emitted by a transmitting antenna and received by a receiving antenna situated in the immediate vicinity of the receiving antenna, consisting of transforming the intefering signal emitted by the transmitting antenna by generating in a phase shifter two signals respectively in phase and in quadrature with the interfering signal, attenuating the in phase and in quadrature signal by means of first and second adjustable attenuators, respectively adding the in phase and in quadrature signals attenuated by said adjustable attenuators and substracting the result obtained from the signal received at the receiving antenna, multiplying the substraction result by the non attenuated in phase and in quadrature signals respectively and filtering the two multiplication results for applying the two results obtained to the input of two integrators for obtaining at the output of these two integrators two static control signals for respectively controlling the attenuators so as to cancel out the component of the carrier frequency of the interfering signal received and superimposing on each of the static control signals a signal whose amplitude is proportional, at all times, to the difference between the carrier frequency of the interfering signal and the instantaneous value of the frequency of its modulation signal $\phi'_B(t)$.

2. The process as claimed in claim 1, wherein the step of superimposing comprises separating the DC and AC components of said filtering results and transforming the AC components obtained into signals whose mean values are proportional to the amplitudes of the separated AC components and multiplying the mean values by the low frequency signal of amplitude $\phi'_B(t)$.

3. The process as claimed in claim 2, consisting of adding each of the static control signals to the signal whose amplitude is proportional, at all times, to the difference between the carrier frequency of the interfering signal and the instantaneous value of the frequency of the modulation signal and applying the resulting signals to respective control inputs of the adjustable attenuators.

4. An electronic antenna decoupling device for suppressing the interfering signal having a carrier frequency modulated in frequency by a low frequency of amplitude $\phi'_B(t)$, emitted by a transmitting antenna and received by a receiving antenna situated in the immediate vicinity of this latter, comprising a phase-shifter connected by its input to the transmitting antenna for producing at a first output a signal in phase with the transmitted interfering signal and at a second output a signal in phase quadrature with the interfering signal, a first variable attenuator connected by its input to the first output of the phase-shifter, second variable attenuator connected by its input to the second output of the phase shifter, an adder connected to the output of said first and second variable attenuators for adding the attenuated in phase and in quadrature signals, a substractor having one input connected to the output of said adder and a second input coupled to the receiving antenna for substracting the adder output from the signal received at the receiving antenna, a first multiplier having one input connected to the output of said substractor and a second input connected to the first output of the phase-shifter, a second multiplier having one input connected to the output of said substractor and a second input connected to the second output of the phase-shifter, a first and a second filter connected by their inputs to the outputs of said first and second multiplier respectively, first and second integrators connected to the outputs of said first and second filters respectively for delivering first and second static control signals for varying said first and second atternuators respectively, a device for superimposing on said first and second static control signal generated by said integrators a first and second signal respectively, said first and second control signal, each having an amplitude proportional, at all times, to the difference between the carrier frequency of the interfering signal and the instantaneous value of the modulation frequency.

5. The device as claimed in claim 4, wherein the device for superimposing comprises a separator separating the DC and AC components of the signal delivered at the respective outputs of the first and second filters a device for transforming the AC components separated by the separator into signals whose mean values are proportional to the amplitudes of the separated AC components, multipliers multiplying the mean values of the signals respectively obtained by the low frequency signal of amplitude $\phi'_B(t)$ and adders for adding respectively the signals obtained at the outputs of the multipliers to the static control signals delivered by the first and second integrators, the respective outputs of the adders being connected to corresponding control inputs of the attenuators.

6. The device as claimed in claim 5, wherein the device for transforming the AC components separated by the separator into signals whose mean values are proportional to the amplitudes of the AC components is formed by third and fourth multipliers each connected by one of their inputs to the respective outputs of the first and second filters and receiving at their second input the low frequency signal of amplitude $\phi'_B(t)$, third and fourth integrators connected by their inputs to the respective outputs of the third and fourth multipliers.

* * * * *